US011968496B2

(12) United States Patent
Satoh et al.

(10) Patent No.: US 11,968,496 B2
(45) Date of Patent: Apr. 23, 2024

(54) ACOUSTIC DEVICE AND SOUND GENERATION DEVICE

(71) Applicant: TDK CORPORATION, Tokyo (JP)

(72) Inventors: Akira Satoh, Tokyo (JP); Kaoru Kijima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 87 days.

(21) Appl. No.: 17/908,058

(22) PCT Filed: Mar. 5, 2021

(86) PCT No.: PCT/JP2021/008801
§ 371 (c)(1),
(2) Date: Aug. 30, 2022

(87) PCT Pub. No.: WO2021/182351
PCT Pub. Date: Sep. 16, 2021

(65) Prior Publication Data

US 2023/0091107 A1 Mar. 23, 2023

(30) Foreign Application Priority Data

Mar. 11, 2020 (JP) ................................ 2020-041752

(51) Int. Cl.
*H04R 17/00* (2006.01)

(52) U.S. Cl.
CPC .................................. *H04R 17/00* (2013.01)

(58) Field of Classification Search
CPC ...... H04R 17/00; H04R 17/005; H04R 17/02; H04R 17/025; H04R 2499/11
See application file for complete search history.

(56) References Cited

U.S. PATENT DOCUMENTS 2,702,354 A * 2/1955 Chorpening ............. H04R 1/46 600/595
3,947,647 A * 3/1976 Swinehart .............. H04R 17/02 381/173

(Continued)

FOREIGN PATENT DOCUMENTS

DE 112018005732 T5 * 7/2020 ......... G01N 29/2437
JP H04-70100 A 3/1992

(Continued)

OTHER PUBLICATIONS

May 18, 2021 International Search Report issued in International Patent Application No. PCT/JP2021/008801.

(Continued)

*Primary Examiner* — Ryan Robinson
(74) *Attorney, Agent, or Firm* — Oliff PLC

(57) ABSTRACT

An acoustic device 3 includes a piezoelectric element and a housing 30. The housing 30 includes a main body portion 31 and a rib portion 35. The main body portion 31 includes a vibrating portion 32 and a plurality of support portions 33. The rib portion 35 is connected to the main body portion 31. The rib portion 35 extends in a third direction between a pair of the support portions **34*a* and 341) facing each other and separated from each other in the third direction intersecting a second direction, when viewed from the second direction along a vibrating surface. A hollow region V is defined by the vibrating portion 32 and the plurality of support portions 33, The above opening S1 is defined by the rib portion 35 and the main body portion 31 and communicates with the hollow region V. The rib portion 35** covers the middle of the hollow region V when viewed from the second direction.

10 Claims, 12 Drawing Sheets

(56) References Cited

U.S. PATENT DOCUMENTS

| | | | | |
|---|---|---|---|---|
| 7,565,949 | B2 * | 7/2009 | Tojo | G06F 1/1605 181/171 |
| 9,826,315 | B2 * | 11/2017 | Makino | H04R 1/06 |
| 10,609,490 | B2 * | 3/2020 | Murakami | H04R 7/22 |
| 10,904,671 | B2 * | 1/2021 | Lafort | H04R 1/2842 |
| 11,308,930 | B2 * | 4/2022 | Uchimura | H04R 1/345 |
| 11,358,537 | B2 * | 6/2022 | Wheeler | H04R 7/04 |
| 2017/0132998 | A1 | 5/2017 | Yamauchi | |
| 2018/0249255 | A1 * | 8/2018 | Ishii | H04R 9/06 |
| 2019/0110130 | A1 * | 4/2019 | Inagaki | H04M 1/03 |
| 2019/0320267 | A1 * | 10/2019 | Chiu | H04R 1/025 |
| 2021/0289287 | A1 * | 9/2021 | Tsuchihashi | H04R 17/00 |
| 2021/0331205 | A1 * | 10/2021 | Ikeda | H10N 30/50 |

FOREIGN PATENT DOCUMENTS

| | | | |
|---|---|---|---|
| JP | H0698397 | A * | 4/1994 |
| WO | 2016/067707 | A1 | 5/2016 |

OTHER PUBLICATIONS

Sep. 6, 2022 International Preliminary Report on Patentability issued in International Patent Application No. PCT/JP2021/008801.

* cited by examiner

ACOUSTIC DEVICE AND SOUND GENERATION DEVICE

TECHNICAL FIELD

The present invention relates to an acoustic device and a sound generation device.

BACKGROUND ART

A known acoustic device has a piezoelectric element. For example, in the acoustic device described in Patent Literature 1, a piezoelectric element is provided on the vibrating surface of a diaphragm. The vibrating surface vibrates by the piezoelectric element being driven, and a sound is emitted in response to the vibration of the vibrating surface.

CITATION LIST

Patent Literature

Patent Literature 1: Japanese Unexamined Patent Publication No. H04-070100

SUMMARY OF INVENTION

Technical Problem

An acoustic device as described above functions as a sound generation device such as a speaker and a buzzer by being provided on a cover member. The cover member is a separate member such as a window, a wall, and the housing of a device having another function. For example, by inputting an electric signal corresponding to a sound source to the piezoelectric element, the piezoelectric element is driven in response to the input electric signal. By the piezoelectric element being driven, the vibrating surface of the diaphragm provided on the cover member vibrates. As a result, the acoustic device emits a sound corresponding to the sound source in a state of being provided on the cover member. However, the vibrating surface is restrained by the cover member with the diaphragm provided on the cover member, and thus it is difficult to improve a sound pressure level.

A structure has been studied in which the restraint on the vibrating surface is suppressed with the acoustic device provided on the cover member by reducing the area of contact between the vibrating surface and a substance other than the atmosphere. However, the sound pressure level at a desired frequency may not be improved simply by suppressing the restraint on the vibrating surface. In the event of a change in sound pressure level between different frequencies in the human audible range, the ratio of humanly felt loudness changes between different pitches. By adjusting a frequency-specific sound pressure level, it is possible to emit a sound closer to a sound source. Accordingly, there is a demand for a configuration in which the sound pressure level in a desired frequency band is adjusted.

An object of one aspect of the present invention is to provide an acoustic device capable of emitting a sound in which the sound pressure level in a desired frequency band is adjusted with the acoustic device provided on a cover member. An object of another aspect of the present invention is to provide a sound generation device capable of emitting a sound in which the sound pressure level in a desired frequency band is adjusted. An object of still another aspect of the present invention is to provide an acoustic device capable of emitting a sound in which the sound pressure level in a desired frequency hand is adjusted with the acoustic device provided on a cover member.

Solution to Problem

An acoustic device in one aspect of the present invention includes a piezoelectric element and a housing. The piezoelectric element is disposed in the housing. The housing includes a main body portion and a rib portion. The main body portion includes a vibrating portion and a plurality of support portions. The vibrating portion includes a vibrating surface where the piezoelectric element is disposed. The plurality of support portions extend from the vibrating portion in a first direction intersecting the vibrating surface. The plurality of support portions are disposed along an edge of the vibrating portion. The rib portion is connected to the main body portion. The rib portion extends in a third direction between a pair of the support portions facing each other and separated from each other in the third direction, when viewed from a second direction along the vibrating surface. The third direction intersects the second direction. A hollow region and an opening are formed in the housing. The hollow region is defined by the vibrating portion and the plurality of support portions. The opening is defined by the rib portion and the main body portion and communicates with the hollow region. The rib portion covers a middle of the hollow region when viewed from the second direction.

In this acoustic device, the rib portion covers the middle of the hollow region defined by the vibrating portion and the plurality of support) portions when viewed from the second direction. According to this configuration, in a case where a sound is emitted with the acoustic device provided on a cover member, the sound pressure level in a desired frequency band is adjusted by the rib portion. In other words, this acoustic device is capable of emitting a sound in which the sound pressure level in a desired frequency band is adjusted in a state of being provided on a cover member.

In the above aspect, the opening defined by the rib portion and the main body portion may penetrate the acoustic device in the first direction. According to this configuration, in a case where a sound is emitted with the acoustic device provided on the cover member, the sound pressure level in the entire frequency band can be improved while the sound pressure level in a desired frequency band is adjusted by the rib portion.

In the above aspect, each of the support portions may include a first edge and a second edge. The first edge may extend along the vibrating portion and be connected to the vibrating portion. The second edge may be positioned on a side opposite to the first edge in the first direction. The second edge of each of the support portions may be farther from the vibrating surface than the rib portion in the first direction when viewed from the second direction. According to this configuration, the opening communicating with the hollow region can be formed between the cover member and the rib portion in a state where the acoustic device is provided on the cover member. Accordingly, in a case where a sound is emitted with the acoustic device provided on the cover member, the sound pressure level in the entire frequency band can be further improved while the sound pressure level in a desired frequency band is adjusted by the rib portion.

In the above aspect, the rib portion may include a pair of end portions and a middle portion. The pair of end portions may be connected to the main body portion. The middle portion may be connected to the pair of end portions and separated from the main body portion. The middle portion may include a curved surface. The curved surface may face the piezoelectric element and be curved so as to be separated from the piezoelectric element in the second direction. According to this configuration, in a case where a sound is emitted with the acoustic device provided on the cover member, the sound pressure level in a desired frequency band can be more appropriately adjusted by the rib portion.

In the above aspect, the curved surface may be continuously connected to the pair of end portions. The curved surface may be curved so as to be separated from the piezoelectric element as a distance from the pair of end portions increases. According to this configuration, in a case where a sound is emitted with the acoustic device provided on the cover member, the sound pressure level in a desired frequency band can be more appropriately adjusted by the rib portion.

In the above aspect, the middle portion may include a plurality of the curved surfaces. The middle portion may include a protruding portion. The protruding portion may protrude toward the vibrating portion from a position sandwiched between the curved surfaces adjacent to each other when viewed from the first direction. According to this configuration, in a case where a sound is emitted with the acoustic device provided on the cover member, the sound pressure level in a desired frequency band can be more appropriately suppressed by the rib portion.

In the above aspect, the housing may include a plurality of the rib portions. The plurality of rib portions may be connected to the main body portion at mutually different positions. The plurality of rib portions may cover the middle of the hollow region when viewed from the second direction corresponding to each of the rib portions.

According to this configuration, the housing includes the plurality of rib portions and each of the rib portions covers the middle of the hollow region when viewed from the second direction. According to this configuration, in a case where a sound is emitted with the acoustic device provided on the cover member, the sound pressure level in a desired frequency band can be more appropriately adjusted by each of the rib portions. The sound pressure level in the entire frequency band can be further improved.

A sound generation device in another aspect of the present invention includes the above acoustic device and a cover member. The cover member includes an attachment surface which faces the vibrating surface and to which the plurality of support portions are connected.

In this sound generation device, the rib portion covers the middle of the hollow region defined by the vibrating portion and the plurality of support portions when viewed from the second direction. According to this configuration, the sound pressure level in a desired frequency band is adjusted by the rib portion. Accordingly, this sound generation device is capable of emitting a sound in which the sound pressure level in a desired frequency band is adjusted.

In the above another aspect, an opening may be formed. This opening may be defined by the cover member, the pair of support portions, and the rib portion when viewed from the second direction. In this case, since the opening is formed between the cover member and the rib portion, the sound pressure level in the entire frequency band is further improved while the sound pressure level in a desired frequency band is adjusted by the rib portion.

An acoustic device in still another aspect of the present invention includes a piezoelectric element and a housing where the piezoelectric element is disposed. The housing includes a main body portion and a rib portion. The main body portion includes a vibrating portion and a support portion. The vibrating portion includes a vibrating surface where the piezoelectric element is disposed. The support portion extends from the vibrating portion in a first direction intersecting the vibrating surface. The rib portion is connected to the main body portion. The rib portion extends in a third direction intersecting a second direction when viewed from the second direction along the vibrating surface. A hollow region and an opening are formed in the housing. The hollow region is defined by the vibrating portion and the support portion. The opening is defined by the rib portion and the main body portion and communicates with the hollow region. The rib portion covers a middle of the hollow region when viewed from the second direction.

In this acoustic device, the rib portion covers the middle of the hollow region defined by the vibrating portion and the support portion when viewed from the second direction. According to this configuration, in a case where a sound is emitted with the acoustic device provided on a cover member, the sound pressure level in a desired frequency band is adjusted by the rib portion. In other words, this acoustic device is capable of emitting a sound in which the sound pressure level in a desired frequency hand is adjusted in a state of being provided on a cover member.

Advantageous Effects of Invention

One aspect of the present invention provides an acoustic device capable of emitting a sound in which the sound pressure level in a desired frequency band is adjusted with the acoustic device provided on a cover member. Another aspect of the present invention provides a sound generation device capable of emitting a sound in which the sound pressure level in a desired frequency band is adjusted. Still another aspect of the present invention provides an acoustic device capable of emitting a sound in which the sound pressure level in a desired frequency band is adjusted with the acoustic device provided on a cover member.

DESCRIPTION OF EMBODIMENTS

Figure 1:
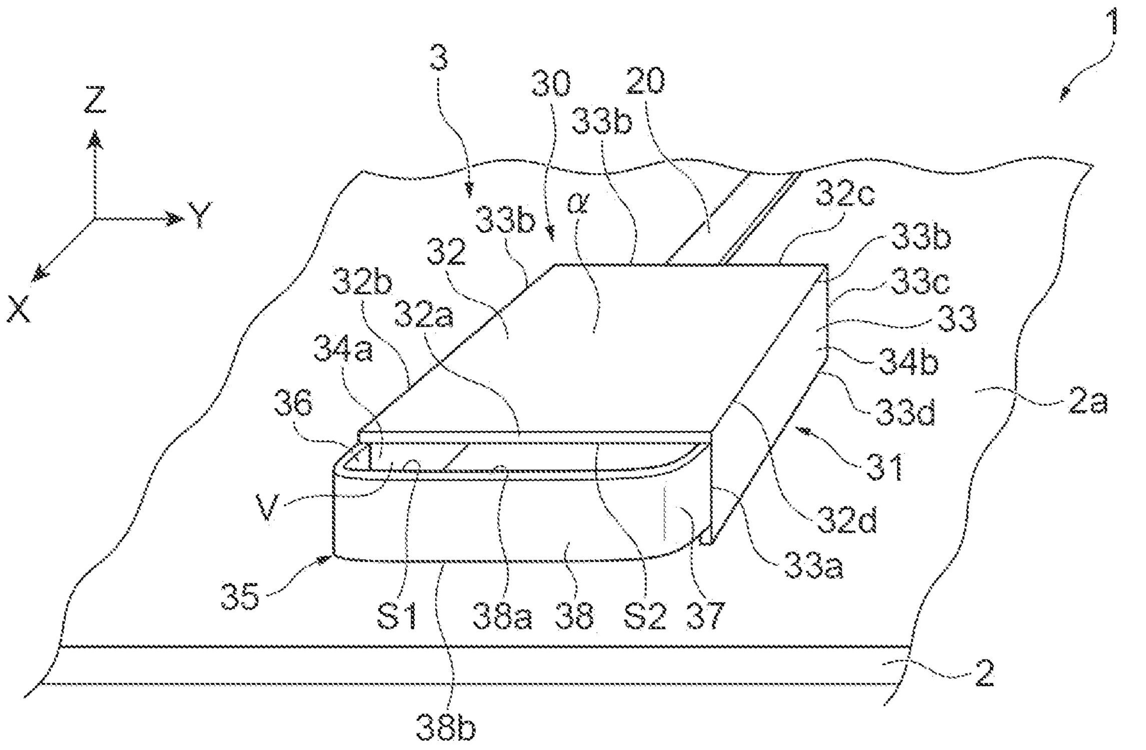
FIG. 1 is a perspective view of a sound generation device according to the present embodiment.

Hereinafter, an embodiment of the present invention will be described in detail with reference to the accompanying drawings. In the description of the drawings, the same reference numerals are used for the same or equivalent elements with redundant description omitted.

The configuration of a sound generation device according to the present embodiment and an acoustic device included in the sound generation device will be described with reference to FIGS. 1 to 5. A sound generation device 1 functions as, for example, a speaker. FIG. 1 is a perspective view of the sound generation device. In FIG. 1, the coordinate axes of the acoustic device are indicated by XYZ axes. The X-axis direction, the Y-axis direction, and the Z-axis direction are mutually orthogonal.

The sound generation device 1 includes a cover member 2 and an acoustic device 3. The cover member 2 includes an attachment surface 2*a* on which the acoustic device 3 is provided. The cover member 2 is, for example, a plate-shaped member. The cover member 2 may be configured integrally with the acoustic device 3 or may be configured as a body separate from the acoustic device 3. The cover member 2 may be, for example, a window, a wall, or the housing of a device having a function different from the function of the acoustic device 3. The acoustic device 3 operates in a state of being provided on the attachment surface 2*a* of the cover member 2.

Figure 2:
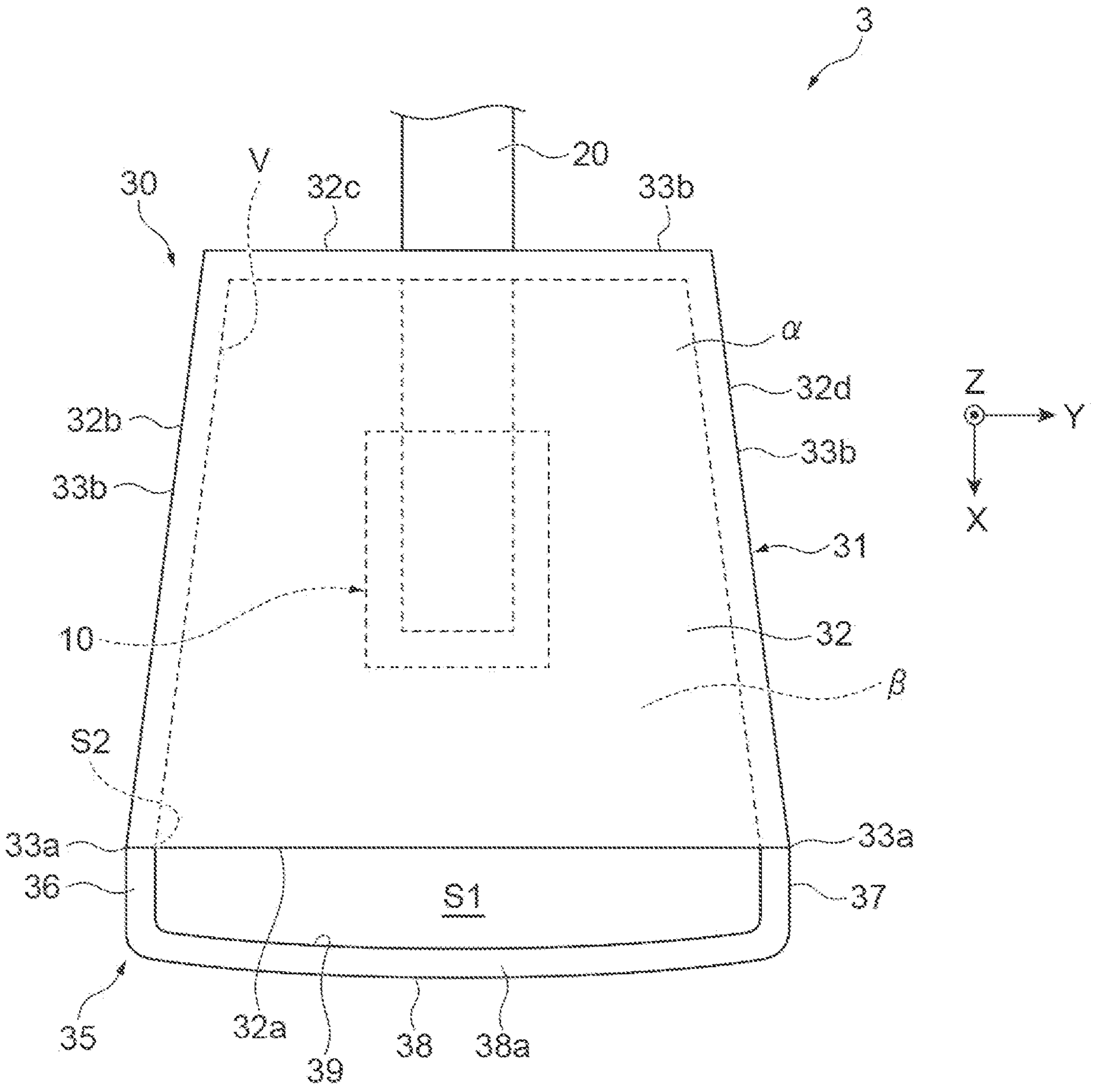
FIG. 2 is a plan view of an acoustic device.
Figure 3:
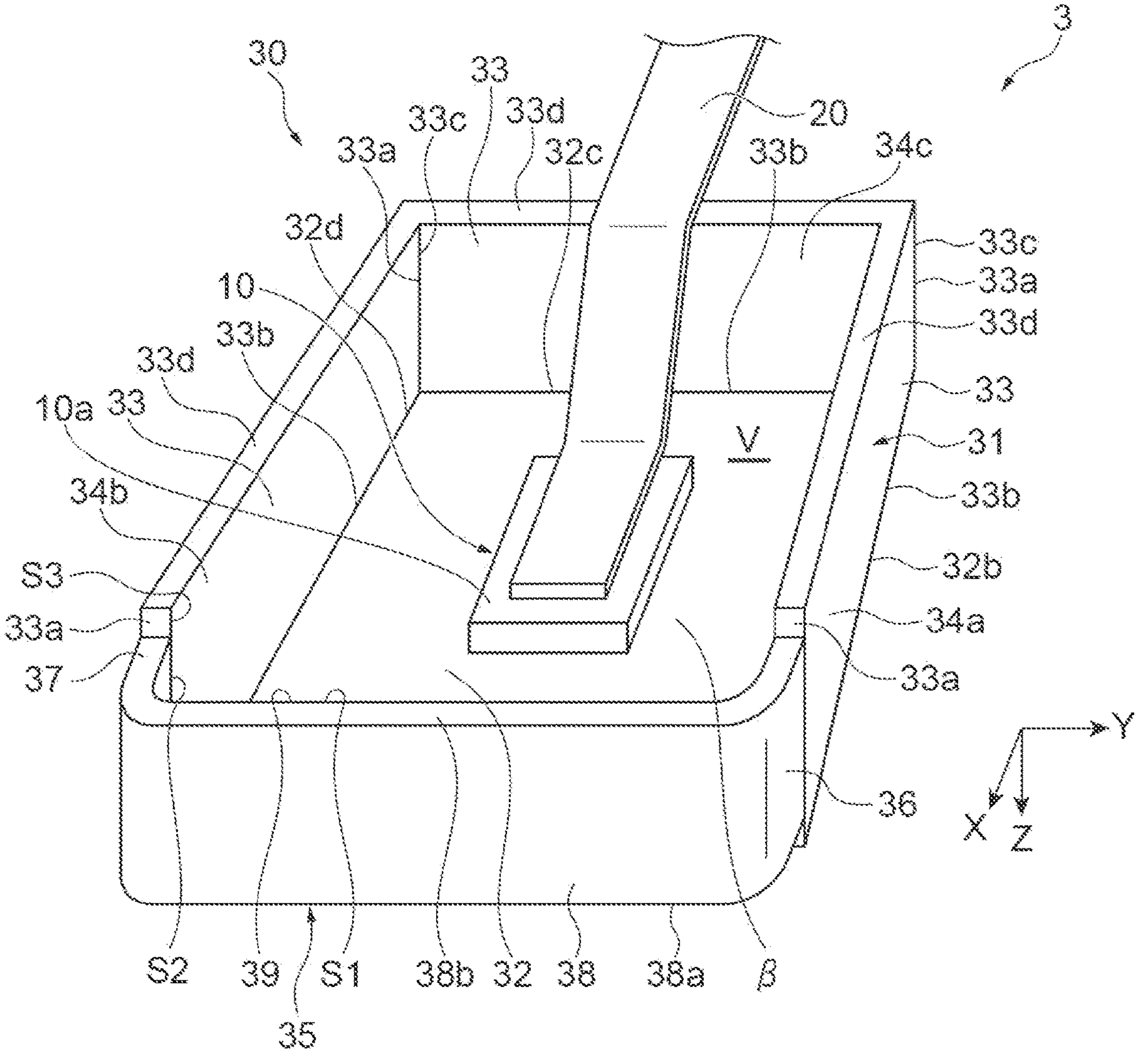
FIG. 3 is a perspective view of the acoustic device.
Figure 4:
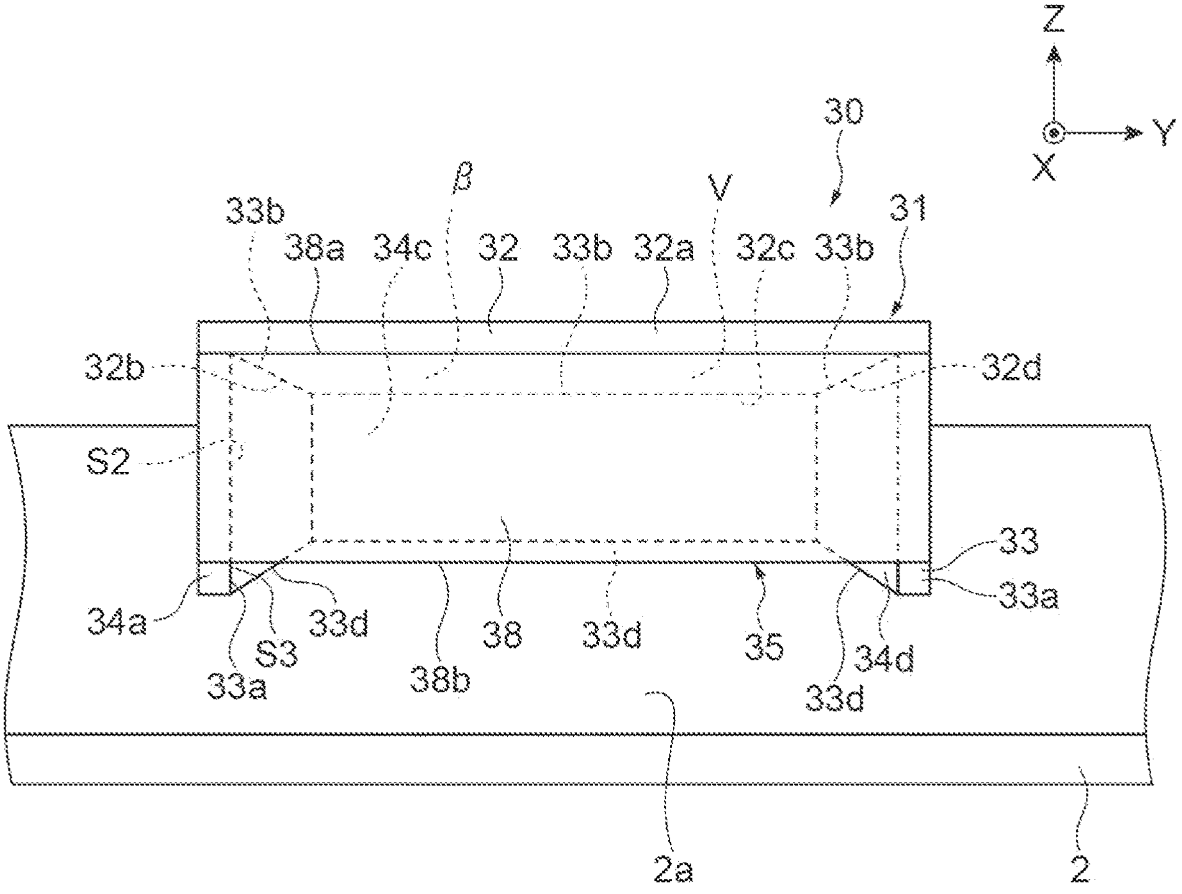
FIG. 4 is a front view of the sound generation device.
Figure 5:
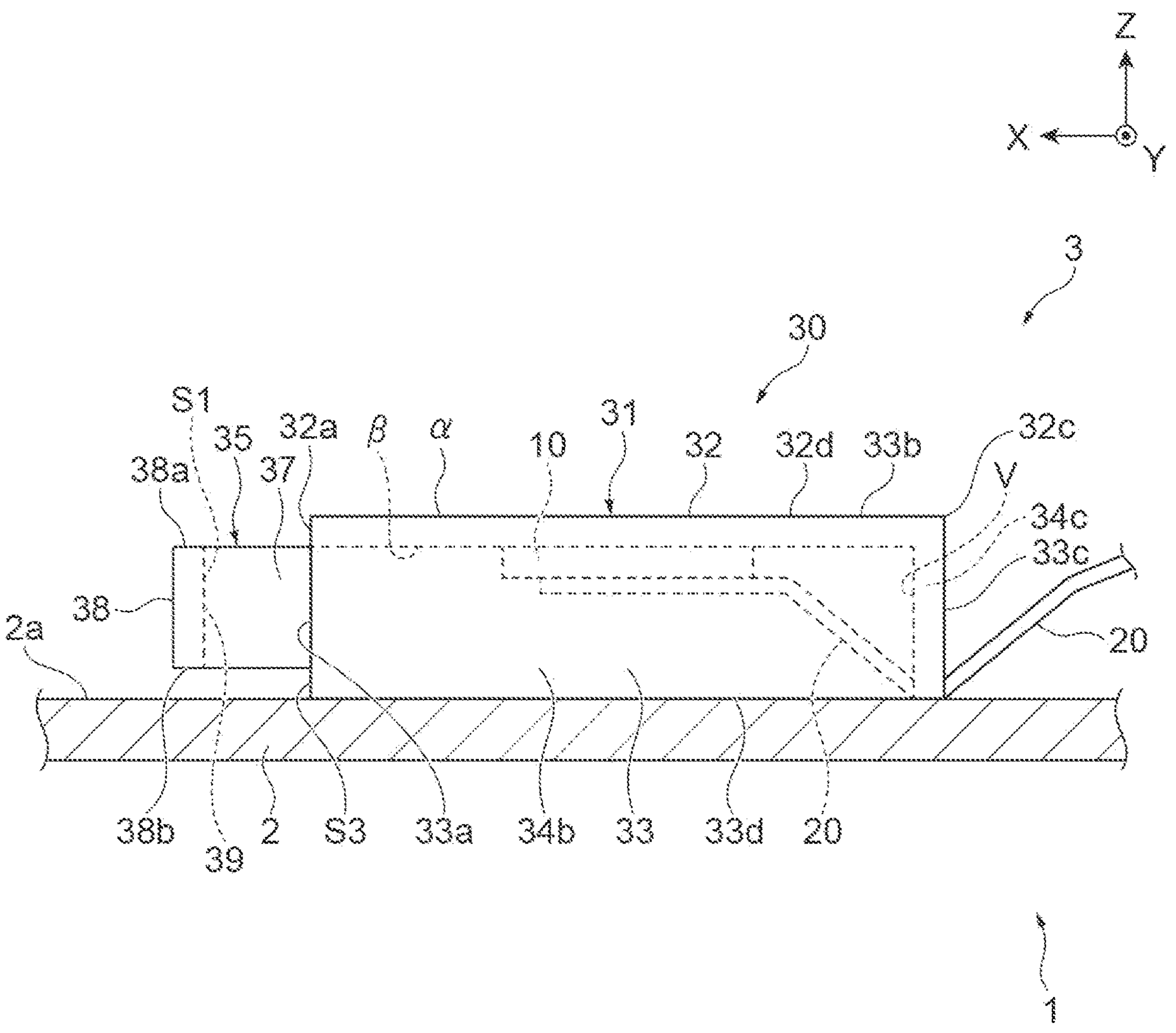
FIG. 5 is a side view of the sound generation device.

FIG. 2 is a plan view of the acoustic device. FIG. 3 is a perspective view of the acoustic device. FIG. 4 is a front view of the sound generation device 1. FIG. 5 is a side view of the acoustic device. In FIGS. 2 to 5, the coordinate axes of the acoustic device are indicated by the XYZ axes. The acoustic device 3 includes a piezoelectric element 10, a wiring member 20, and a housing 30. The piezoelectric element 10 is housed in the housing 30 and operates by electric power supply from the wiring member 20. As a modification example of the present embodiment, the acoustic device 3 may be configured such that the wiring member 20 is not provided and the wiring member is attached later when the acoustic device 3 is operated.

The piezoelectric element 10 includes a piezoelectric element body 10*a* and a pair of external electrodes (not illustrated). The piezoelectric element body 10*a* is configured by stacking a plurality of piezoelectric body layers (not illustrated). Each piezoelectric body layer is made of a piezoelectric material. For example, each piezoelectric body layer is made of a piezoelectric ceramic material. Used as the piezoelectric ceramic material is, for example, VLF [Pb (Zr, Ti) $O_3$], PT ($PbTiO_3$), PLZT [(Pb, La) (Zr, Ti) $O_3$], or barium titanate ($BaTiO_3$). Each piezoelectric body layer is configured from, for example, a sintered body of a ceramic green sheet containing the above piezoelectric ceramic material. In the actual piezoelectric element body 10*a*, the respective piezoelectric body layers are integrated to the extent that the boundaries between the respective piezoelectric body layers cannot be recognized. A plurality of internal electrodes (not illustrated) are disposed in the piezoelectric element body 10*a*. Each internal electrode is made of a conductive material. Used as the conductive material is, for example, Ag, Pd, or an Ag—Pd alloy.

The wiring member 20 is, for example, a flexible printed circuit (FPC). The wiring member 20 is electrically connected to each external electrode of the piezoelectric element 10, The wiring member 20 includes one end portion electrically and physically connected to the piezoelectric element 10 and the other end portion electrically and physically connected to an electronic device (not illustrated) where the acoustic device 3 is mounted.

The housing 30 houses the piezoelectric element 10 between the housing 30 and the cover member 2. The housing 30 includes a main body portion 31 and a rib portion 35. The piezoelectric element 10 is disposed in the main body portion 31. The rib portion 35 is connected to the main body portion 31. The housing 30 has an opening S1. The opening S1 is defined by the edge of the main body portion 31 and the edge of the rib portion 35. As illustrated in FIG. 2, the opening S1 penetrates the acoustic device 3 in the Z-axis direction. The main body portion 31 includes a vibrating portion and a support portion 33. The material configuring the housing 30 includes, for example, a synthetic material of a polycarbonate resin and an ABS resin, an ABS resin, a polybutylene terephthalate resin, a polyphenylene sulfide resin, and a liquid crystal polymer resin.

The vibrating portion 32 functions as a diaphragm vibrating in response to the displacement of the piezoelectric element 10. The vibrating portion 32 has a flat plate shape and includes a pair of main surfaces α and β. For example, the main surfaces α and β are flat surfaces. The main surface α and the main surface β are positioned on mutually opposite sides. Each of the main surfaces α and β is orthogonal to the Z-axis direction. Each of the main surfaces α and β is along the X-axis direction and the Y-axis direction. For example, each of the main surfaces α and β is parallel to the X-axis direction and the Y-axis direction. The main surface β faces the attachment surface 2*a* of the cover member 2 in the Z-axis direction. The piezoelectric element 10 is disposed on the main surface β by an adhesive member such as an adhesive and a double-sided tape. The piezoelectric element 10 is disposed in the middle of the main surface β when, for example, viewed from the direction orthogonal to the main surface β. The main surface β is a vibrating surface vibrating in response to the operation of the piezoelectric element 10. For example, the piezoelectric element 10 is disposed on the main surface β and vibrates the main surface β when operated.

The vibrating portion 32 includes edges 32*a*, 32*b*, 32*c*, and 32*d* defining the main surface β, For example, the vibrating portion 32 has a rectangular shape and is defined by the edges 32*a*, 32*b*, 32*c*, and 32*d* when viewed from the direction orthogonal to the main surface β. The main surface β is a rectangular flat surface. The edge 32*a* and the edge 32*c* are positioned on mutually opposite sides in the X-axis direction. The edge 32*b* and the edge 32*d* are positioned on mutually opposite sides in the Y-axis direction.

The support portion 33 supports the vibrating portion 32. The support portion 33 extends along the main surface β of the vibrating portion 32 and is connected to the main surface 1 of the vibrating portion 32. The support portion 33 is disposed along each of the edges 32*b*, 32*c*, and 32*d* of the vibrating portion 32. For example, the support portion 33 is connected to the edges 32*h*, 32*c*, and 32*d* of the vibrating portion 32. As a modification example of the present embodiment, the support portion 33 may be separated from the edge of the vibrating portion 32 and disposed along the edge of the vibrating portion 32. The support portion 33 extends from the vibrating portion 32 in a direction intersecting the main surface β. For example, the support portion 33 extends in the Z-axis direction from the main surface β.

The support portion 33 extends from the main surface β toward the attachment surface 2*a* of the cover member 2 in a state where the housing 30 is attached to the attachment surface 2*a* of the cover member 2. The support portion 33 supports the vibrating portion 32 such that the cover member 2 and the main surface β of the vibrating portion are separated. The support portion 33 is connected to the attachment surface 2*a* of the cover member 2.

A hollow region V defined by the vibrating portion 32 and the support portion 33 is formed in the housing 30. In other words, the hollow region V is a space surrounded by time vibrating portion 32 and the support portion 33. The hollow region V is defined by the attachment surface 2*a*, the vibrating portion 32, and the support portion 33 in a state where the housing 30 is attached to the attachment surface 2*a* of the cover member 2. The piezoelectric element 10 is accommodated in the hollow region V The hollow region V communicates with the opening S1.

The wiring member 20 passes between the cover member 2 and the support portion 33 and extends to the outside from the hollow region V As a modification example of the present embodiment, a cushioning member may be provided between the support portion 33 and the attachment surface 2*a*. In this case, the wiring member 20 may pass between the cushioning member and the support portion 33 and extend from the hollow region V to the outside of the hollow region V The material configuring the cushioning member includes, for example, rubber, a urethane resin, and a phenol resin. The rubber includes foamed butyl rubber.

The support portion 33 includes a plurality of support portions 34*a*, 34*b*, and 34*c*. For example, the plurality of support portions 34*a*, 34*b*, and 34*c* are integrally interconnected. The support portion 34*a* and the support portion 34*b* are one end portion and the other end portion of the support portion 33, respectively. Each of the support portions 34*a*, 34*b*, and 34*c* has a flat plate shape. Each of the support portions 34*a*, 34*b*, and 34*c* has a rectangular shape in a plan view and includes edges 33*a*, 33*b*, 33*c*, and 33*d*. The edge 33*a* and the edge 33*c* are positioned on mutually opposite sides in the X-axis direction. The edge 33*h* and the edge 33*d* are positioned on mutually opposite sides in the Z-axis direction. The edges 33*b* and 33*d* are greater in length than the edges 33*a* and 33*c*. The edges 33*b* and 33*d* of each of the support portions 34*a*, 34*b*, and 34*c* extend along the main surface β. For example, the edges 33*b* and 33*d* are parallel to the main surface β. The edges 33*a* and 33*c* of each of the support portions 34*a*, 34*b*, and 34*c* extend in a direction intersecting the main surface β. The edge 33*h* of each of the support portions 34*a*, 34*b*, and 34*c* is connected to the main surface β of the vibrating portion 32. As a modification example of the present embodiment, the plurality of support portions 34*a*, 34*b*, and 34*c* may be mutually separated. In the modification example, the support portion 33 may not include the support portion 34*c*.

The support portion 34*a* and the support portion 34*b* face and are separated from each other in the Y-axis direction. The support portion 34*a* and the support portion 34*h* are positioned so as to sandwich the piezoelectric element 10 in the Y-axis direction when viewed from the X-axis direction. The support portion 34*c* is connected to the pair of support portions 34*a* and 34*h*. The edge 33*a* of the support portion 34*c* is connected to the edge 33*c* of the support portion 34*a*, and the edge 33*c* of the support portion 34*c* is connected to the edge 33*c* of the support portion 34*b*. The piezoelectric element 10 is surrounded by the plurality of support portions 34*a*, 34*b*, and 34*c*. The piezoelectric element 10 is positioned between the support portions 34*a* and 34*b* in the direction in which the pair of support portions 34*a* and 34*b* face each other. For example, the piezoelectric element 10 is positioned between the edge 33*a* and the edge 33*c* of the support portion 34*a* and is positioned between the edge 33*a* and the edge 33*c* of the support portion 34*h* when viewed from the Y-axis direction.

For example, the edges 33*h* of the support portions 34*a*, 34*b*, and 34*c* are connected to the edges 32*b*, 32*c*, and 32*d* of the vibrating portion 32 and extend along the connected edges 32*b*, 32*c*, and 32*d*, respectively. The plurality of support portions 34*a*, 34*b*, and 34*c* extend in the direction orthogonal to the main surface β from the edges 32*b*, 32*c*, and 32*d* of the vibrating portion 32. The edges 33*a* and 33*c* of each of the support portions 34*a*, 34*b*, and 34*c* extend in the Z-axis direction. The edges 33*b* and 33*d* of the support portion 34*c* extend in the Y-axis direction. The edges 33*b* and 33*d* of the pair of support portions 34*a* and 34*b* extend in a direction orthogonal to the Z-axis direction and intersecting the Y axis direction. In a state where the housing 30 is attached to the attachment surface 2*a* of the cover member 2, the hollow region V is defined by the attachment surface 2*a*, the vibrating portion 32, the support portion 34*a*, the support portion 34*b*, and the support portion 34*c*.

For example, the wiring member 20 passes between the edge 32*d* of the support portion 34*c* and the attachment surface 2*a* and extends from the hollow region V to the outside of the hollow region V. The wiring member 20 is in contact with the edge 32*d* of the support portion 34*c* in a state where the acoustic device 3 is attached to the cover member 2.

An opening S2 is formed in the main body portion 31. The opening S2 is defined by the edge 32*a* of the vibrating portion 32, the edge 33*a* of the support portion 34*a*, and the edge 33*a* of the support portion 34*b*. The opening S2 communicates with the hollow region V For example, the opening S2 has a rectangular shape including the edge 32*a* of the vibrating portion 32, the edge 33*a* of the support portion 34*a*, and the edge 33*a* of the support portion 34*b* as three sides when viewed from the X-axis direction. In a state where the housing 30 is attached to the attachment surface 2*a* of the cover member 2, the opening S2 is defined by the attachment surface 2*a*, the edge 32*a* of the vibrating portion 2, the edge 33*a* of the support portion 34*a*, and the edge 33*a* of the support portion 34*b*.

The rib portion 35 is connected to the main body portion 31, For example, the rib portion 35 is connected to the edge 33*a* of the support portion 34*a* and the edge 33*a* of the support portion 34*b*. The rib portion 35 extends in the direction in which the pair of support portions 34*a* and 34*b* face each other. The rib portion 35 has a long shape and includes a long side extending in the Y-axis direction. The rib portion 35 extends in the Y-axis direction between the pair of support portions 34*a* and 34*b* when viewed from the X-axis direction.

The rib portion 35 covers at least the middle of the opening S2 when viewed from the X-axis direction. In other words, the rib portion 35 covers the middle of the hollow region V when viewed from the X-axis direction. "Covering the middle of a region" means covering at least the geometric center of the region. For example, the cross-sectional shape of the rib portion 35 along the XY-axis plane is the same in the Z-axis direction. The width of the rib portion 35 in the Z-axis direction is, for example, approximately 1 to 10 mm. In the configuration illustrated in FIG. 1, the width of the rib portion 35 in the Z-axis direction is 5 mm.

The rib portion 35 includes a pair of end portions 36 and 37 and a middle portion 38. The pair of end portions 36 and 37 are connected to the main body portion 31. The middle portion 38 is connected to the pair of end portions 36 and 37. The middle portion 38 is separated from the main body portion 31. For example, each of the pair of end portions 36 and 37 is connected to the main body portion 31 by an adhesive member such as an adhesive and a double-sided tape. As a modification example of the present embodiment, the rib portion 35 may be configured integrally with the main body portion 31. For example, the end portion 36 of the rib portion 35 is connected to the edge 33*a* of the support portion 34*a*. The end portion 37 of the rib portion 35 is connected to the edge 33*a* of the support portion 34*b*. As a modification example of the present embodiment, at least one of the pair of end portions 36 and 37 may be connected to a part other than the edge 33*a*. For example, at least one of the pair of end portions 36 and 37 may be connected to the edge 32*a* of the vibrating portion 32.

FIG. 4 is a diagram in which the sound generation device 1 is viewed from the X-axis direction. In FIG. 4, the piezoelectric element 10 and the wiring member 20 are omitted. As illustrated in FIG. 4, the edges 33*d* of the support portions 34*a*, 34*b*, and 34*c* are farther from the main surface of the vibrating portion 32 than the rib portion 35 in the Z-axis direction when viewed from the X-axis direction. In other words, the support portions 34*a*, 34*b*, and 34*c* protrude from the rib portion 35 in the Z-axis direction when viewed from the X-axis direction. Accordingly, an opening S3 is formed in the sound generation device 1 where the cover member 2 is provided with the acoustic device 3. The opening S3 is defined by the cover member 2, the pair of support portions 34*a* and 34*b*, and the rib portion 35 when viewed from the X-axis direction. In a state where the acoustic device 3 is attached to the cover member 2, the middle portion 38 of the rib portion 35 is separated from the vibrating portion 32.

The middle portion 38 has a rectangular shape and extends in the Y-axis direction from one of the end portion 36 and the end portion toward the other. The middle portion 38 includes edges 38*a* and 38*b* extending in the Y-axis direction. The edges 38*a* and 38*b* are the long sides of the middle portion 38. The edge 38*a* and the edge 38*b* are positioned on mutually opposite sides in the Z-axis direction. The edge 38*a* of the middle portion 38 defines the opening S1 together with the edge 32*a* of the vibrating portion 32. The middle portion 38 covers at least the middle of the opening S2 and faces the piezoelectric element 10 when viewed from the X-axis direction. The middle portion 38 is disposed between the pair of support portions 34*a* and 34*b* when viewed from the X-axis direction. In other words, the middle portion 38 is disposed so as to overlap the hollow region V when viewed from the X-axis direction.

The middle portion 38 includes at least one curved surface 39. The curved surface 39 faces the piezoelectric element 10. The curved surface 39 faces the support portion 34*c*, The curved surface 39 is curved so as to be separated from the piezoelectric element 10 in the X-axis direction. The curved surface 39 is curved so as to be separated from the main surface β in the X-axis direction when viewed from the Z-axis direction. As illustrated in FIG. 2, the curved surface 39 is curved in a bow shape so as to have a convex shape in the X-axis direction when viewed from the Z-axis direction. The radius of curvature of the curved surface 39 is, for example, approximately 148 mm to 150 mm.

For example, the middle portion 38 includes one curved surface 39. The curved surface 39 is continuously connected to the pair of end portions 36 and 37. The curved surface 39 is curved so as to be separated from the piezoelectric element 10 in the X-axis direction as the distance from the pair of end portions 36 and 37 increases. The curved surface 39 is curved so as to be separated from the main surface β in the X-axis direction as the distance from the pair of end portions 36 and 37 increases when viewed from the Z-axis direction.

Figure 6:
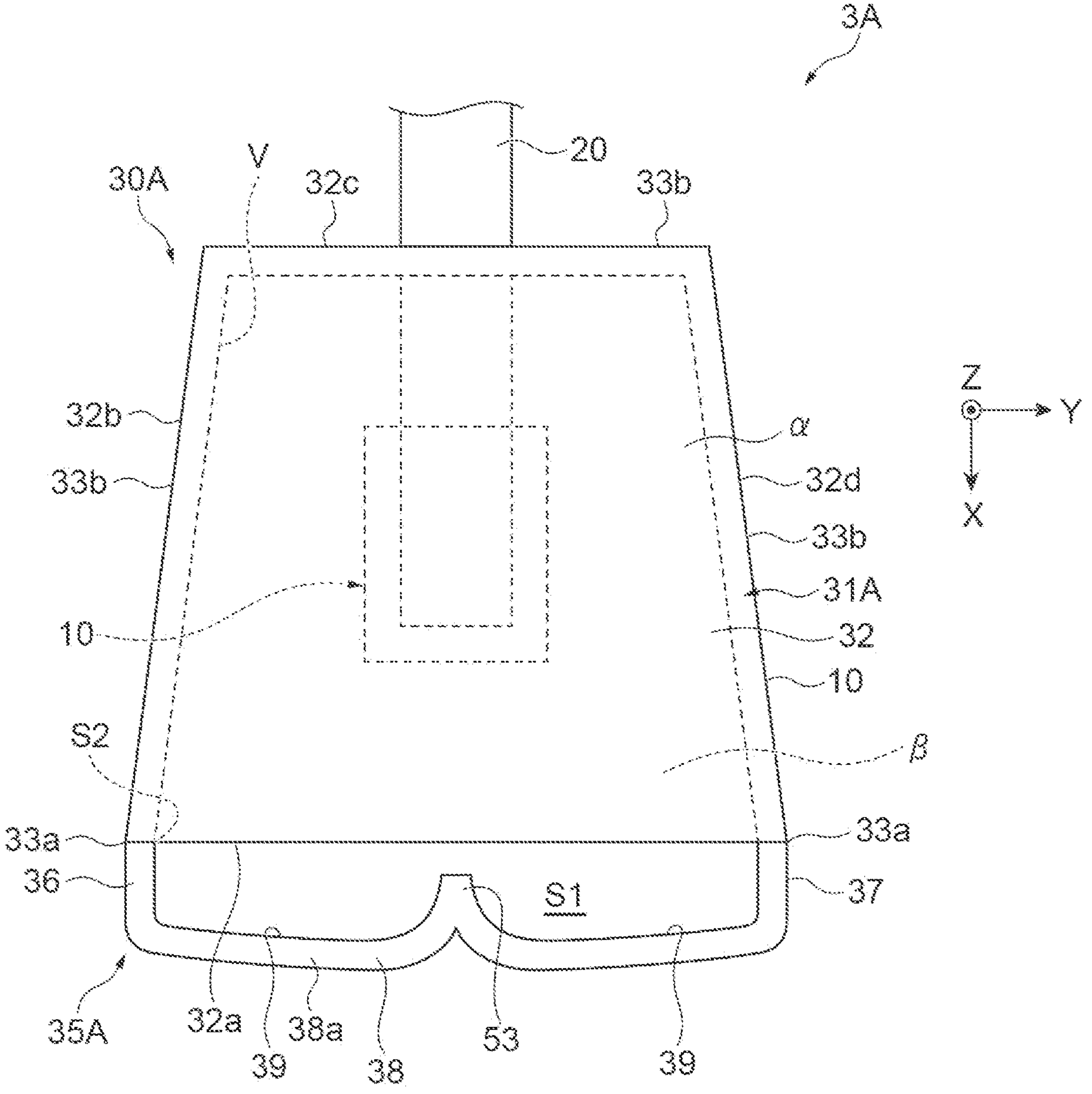
FIG. 6 is a plan view of an acoustic device in a modification example of the present embodiment.
Figure 7:
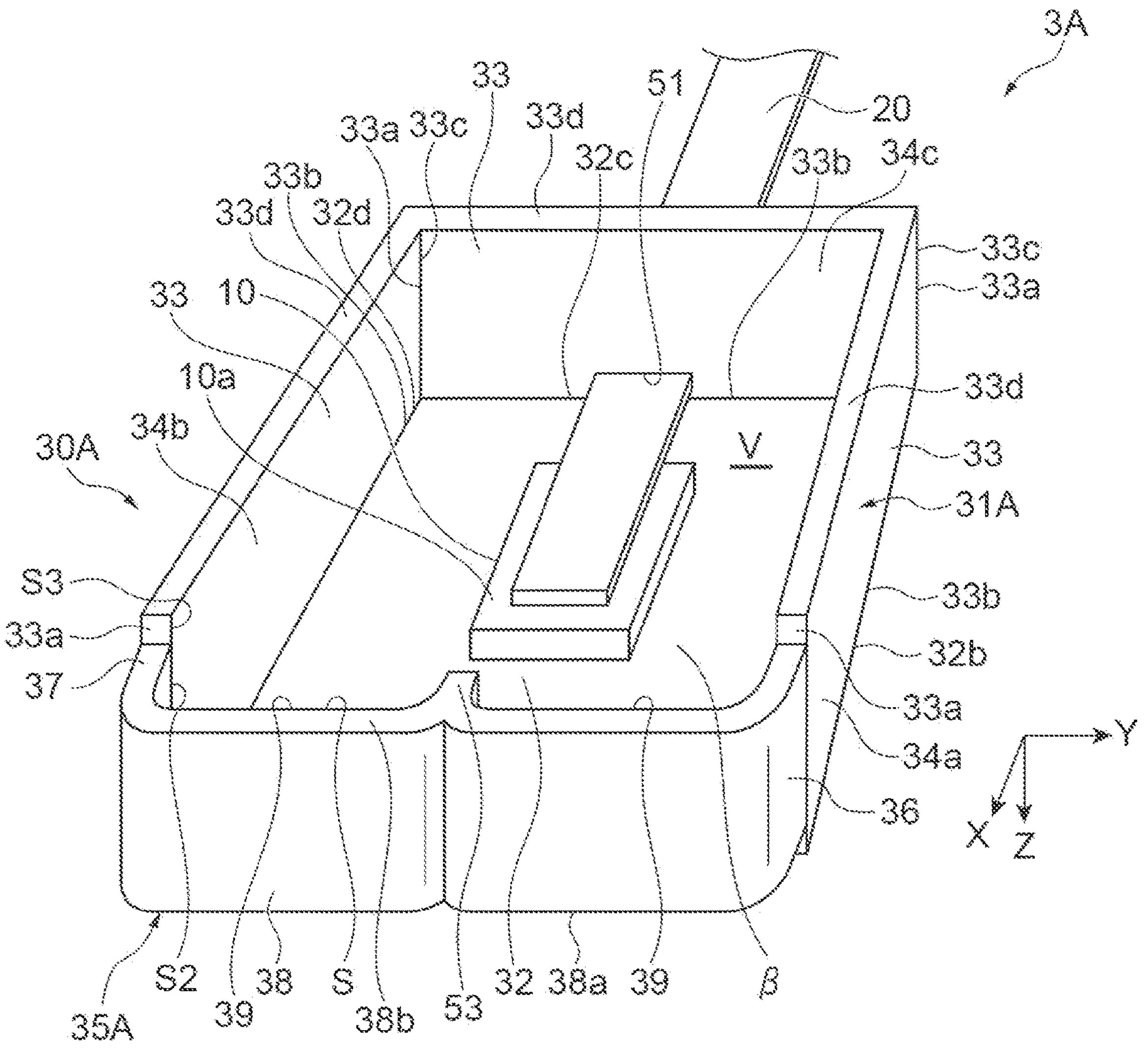
FIG. 7 is a perspective view of the acoustic device in the modification example of the present embodiment.

Next, an acoustic device in a modification example of the above embodiment will be described with reference to FIGS. 6 and 7. In this modification example, an acoustic device 3A differs from the acoustic device 3 in the above embodiment in terms of rib portion shape and in that a through port penetrated by the wiring member is formed in a main body portion. Hereinafter, the differences from the above embodiment will be mainly described. FIG. 6 is a plan view of the acoustic device 3A in this modification example. FIG. 7 is a perspective view of the acoustic device 3A in this modification example.

The acoustic device 3A includes a housing 30A instead of the housing 30. The housing 30A includes a main body portion 31A and a rib portion 35A. The main body portion 31A differs from the main body portion 31 in that the main body portion 31A includes the support portion 34*c* where a through port 51 is formed. The wiring member 20 extends from the hollow region V to the outside of the hollow region V through the through port 51.

The rib portion 35A differs from the rib portion 35 in the following points. The middle portion 38 of the rib portion 35A includes a plurality of the curved surfaces 39. As illustrated in FIG. 6, the middle portion 38 includes a protruding portion 53 protruding from the position sandwiched between the mutually adjacent curved surfaces 39. The protruding portion 53 protrudes toward the vibrating portion 32 in the X-axis direction when viewed from the Z-axis direction. The protruding portion 53 extends in the Z-axis direction. The protruding portion 53 is separated from the main body portion 31. The cross-sectional shape of the protruding portion 53 along the XY-axis plane is the same in the Z-axis direction. The cross-sectional shape of the rib portion 35A along the XY-axis plane is the same in the Z-axis direction.

In this modification example, the middle portion 38 includes two curved surfaces 39. Each curved surface 39 is continuously connected to one of the pair of end portions 36 and 37 and the protruding portion 53. As a further modification example of this modification example, the protruding portion 53 may be connected to the vibrating portion 32.

Figure 8:
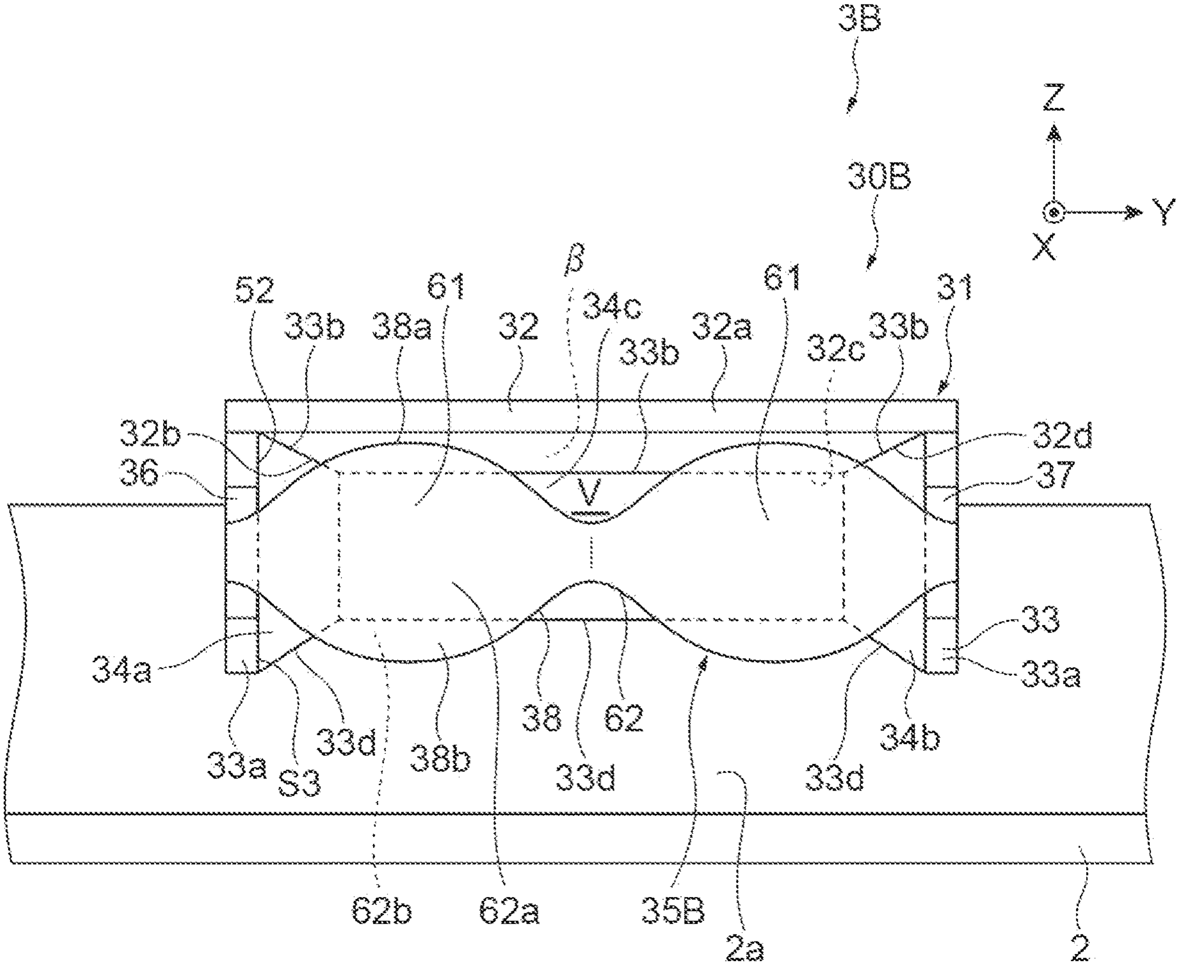
FIG. 8 is a front view of an acoustic device in another modification example of the present embodiment.
Figure 9:
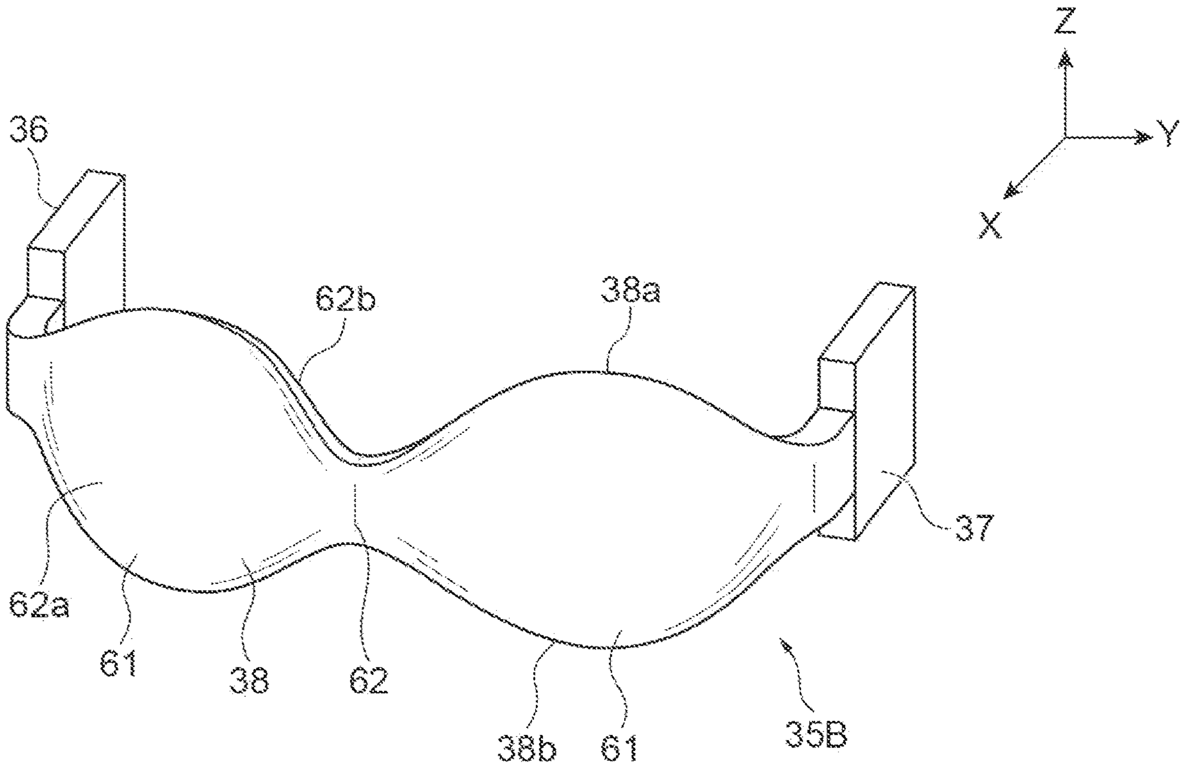
FIG. 9 is a perspective view of a rib portion of the acoustic device in another modification example of the present embodiment.

Next, an acoustic device in still another modification example of the above embodiment will be described with reference to FIGS. 8 and 9. In this modification example, an acoustic device 3B differs from the acoustic device 3 in the above embodiment in terms of rib portion shape. Hereinafter, the difference from the above embodiment will be mainly described. FIG. 8 is a front view of the acoustic device 3B in this modification example. FIG. 9 is a perspective view of a rib portion of the acoustic device 3B in this modification example.

The acoustic device 3B includes a housing 30B instead of the housing 30. The housing 30B includes the main body portion 31 and a rib portion 35B, FIG. 8 is a diagram in which the acoustic device 3B is viewed from the X-axis direction. In FIG. 8, the piezoelectric element 10 and the wiring member 20 are omitted. The rib portion 35B differs from the rib portion 35 in the following points.

The middle portion 38 of the rib portion 35B includes at least one curved surface 39. The middle portion 38 of the rib portion 35B includes at least: one dish-shaped portion 61. In this modification example, the middle portion 38 includes two dish-shaped portions 61 and further includes a saddle-shaped portion 62 connecting the two dish-shaped portions 61. The dish-shaped portion 61 has a meniscus shape and includes a convex surface 62*a* and a concave surface 62*b*. The convex surface 62*a* and the concave surface 62*b* are positioned on mutually opposite sides. The concave surface 62*b* includes the curved surface 39. When viewed from the X-axis direction, the edge of the dish-shaped portion 61 is separated from the edge of the hollow region V.

Figure 10:
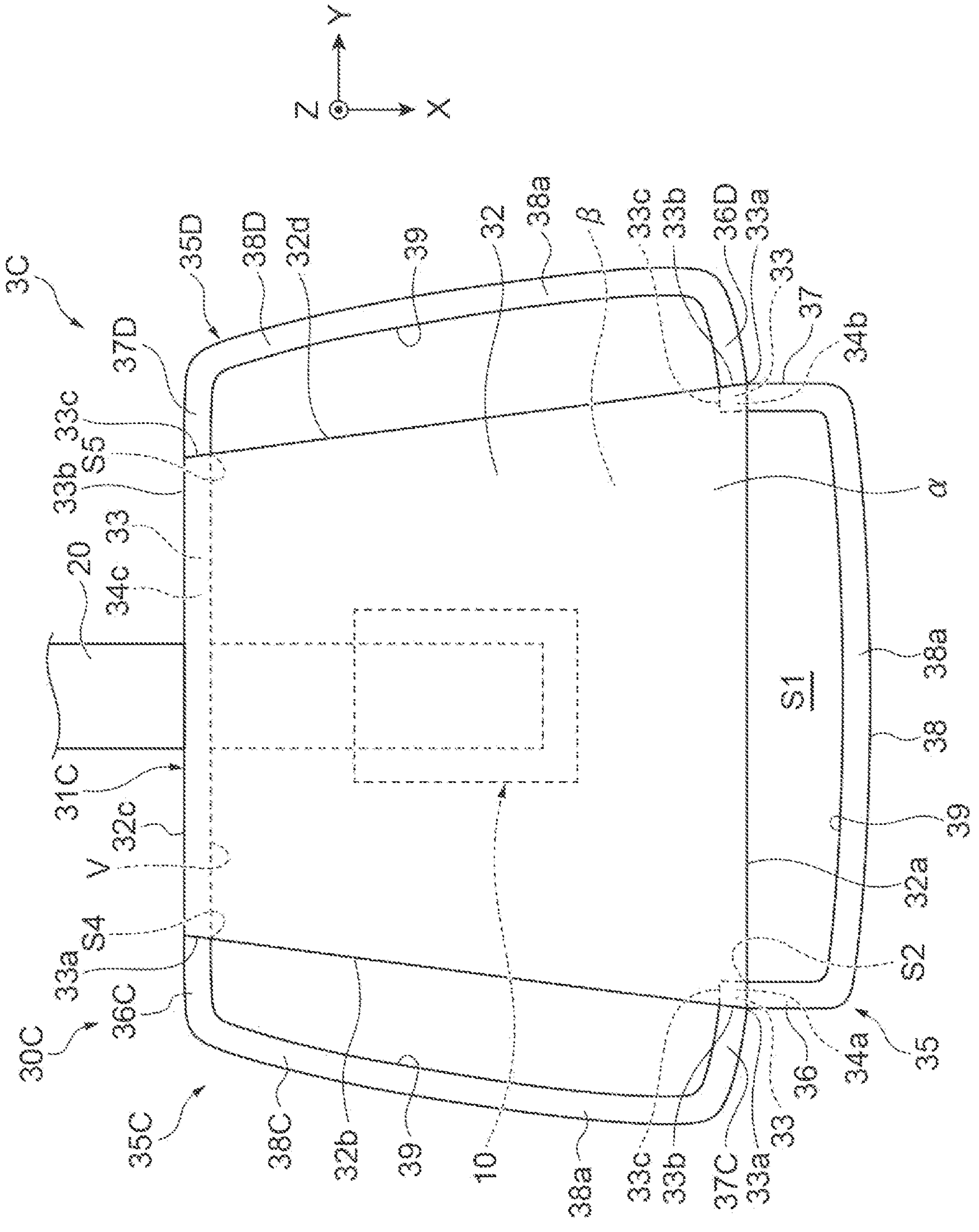
FIG. 10 is a plan view of an acoustic device in another modification example of the present embodiment.
Figure 11:
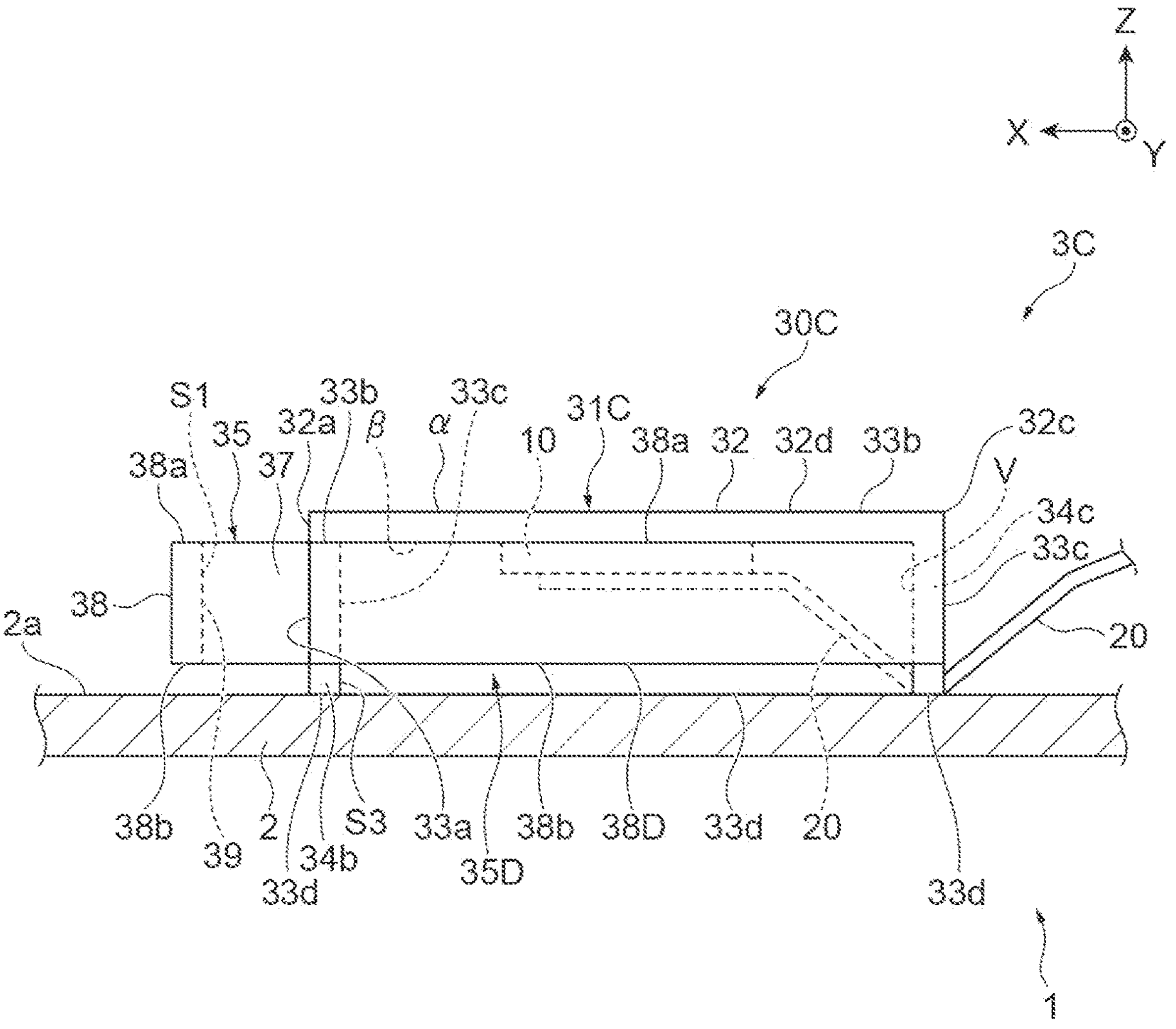
FIG. 11 is a side view of the acoustic device in another modification example of the present embodiment.

Next, an acoustic device in still another modification example of the above embodiment will be described with reference to FIGS. 10 and 11. In this modification example, an acoustic device 3C differs from the acoustic device 3 in the above embodiment in that the acoustic device 3C includes the rib portion 35, a rib portion 35C, and a rib portion 351), which are plurality of rib portions. Hereinafter, the difference from the above embodiment will be mainly described. FIG. 10 is a plan view of the acoustic device 3C in this modification example. FIG. 11 is a side view of the acoustic device 3C in this modification example. The acoustic device 3C includes a housing 30C. The housing 30C differs from the housing 30 in the following points.

The housing 30C includes a main body portion 31C, the rib portion 35, and the rib portions 35C and 35D. The main body portion 31C differs from the main body portion 31 in terms of the configuration of the support portions 34*a* and 34*b*. The support portions 34*a* and 34*b* of the main body portion 31C have a pillar shape and extend in a direction intersecting the main surface β. Accordingly, as illustrated in FIG. 11, in the support portion 34*b* of the main body portion 31C, the edges 33*b* and 33*d* are smaller in length than the edges 33*a* and 33*c*. The same applies to the support portion 34*a* of the main body portion 31C. The support portions 34*a* and 34*b* of the main body portion 31C are separated from the support portion 34*c*.

Openings S4 and S5 in addition to the opening S2 are formed in the main body portion 31C. The opening S4 is defined by the edge 32*b* of the vibrating portion 32, the edge 33*c* of the support portion 34*a*, and the edge 33*a* of the support portion 34*c*. The opening S5 is defined by the edge 32*d* of the vibrating portion 32, the edge 33*c* of the support portion 34*h*, and the edge 33*c* of the support portion 34*c*. The openings S4 and S5 communicate with the hollow region V In this modification example, the opening S4 has a rectangular shape including the edge 32*b* of the vibrating portion 32, the edge 33*c* of the support portion 34*a*, and the edge 33*a* of the support portion 34*c* as three sides when viewed from the Y-axis direction. The opening S5 has a rectangular shape including the edge 32*d* of the vibrating portion 32, the edge 33*c* of the support portion 34*b*, and the edge 33*c* of the support portion 34*c* as three sides when viewed from the Y-axis direction.

The rib portions 35C and 35D have the same shape as the rib portion 35. The rib portions 35, 35C, and 35D are respectively connected to the main body portion 31 at mutually different positions. For example, each of the pair of rib portions 35C and 35D is connected to the main body portion 31C by an adhesive member such as an adhesive and a double-sided tape. The rib portions 35C and 35D may be configured integrally with the main body portion 31C, The rib portions 35C and 35D have a long shape including a long side extending in a direction orthogonal to the Z-axis direction and intersecting the Y-axis direction. The rib portions 35C and 35D extend in the X-axis direction.

The rib portion 35C extends in the X-axis direction between the support portion 34*a* and the support portion 34*c* when viewed from the Y-axis direction. The rib portion 35C covers at least the middle of the opening S4 when viewed from the Y-axis direction. In other words, the rib portion 35C covers the middle of the hollow region V when viewed from the direction corresponding to the rib portion 35C. The rib portion 35C includes a pair of end portions 36C and 37C and a middle portion 38C. The pair of end portions 36C and 37C are connected to the main body portion 31C. The middle portion 38C is connected to the pair of end portions 36C and 37C. The middle portion 38C is separated from the main body portion 31C. In this modification example, the end portion 36C of the rib portion 35C is connected to the support portion 34*c*, and the end portion 37C of the rib portion 35C is connected to the support portion 34*a*.

The middle portion 38C extends in the X-axis direction from one of the end portion 36C and the end portion 37C toward the other. The middle portion 38C has the same shape as the middle portion 38. The edge 38*a* of the middle portion 38C defines the opening S1 together with the edge 32*b* of the vibrating portion 32. The middle portion 38C covers at least the middle of the opening S4 and faces the piezoelectric element 10 when viewed from the X-axis direction. The middle portion 38C is disposed between the pair of support portions 34*a* and 34*c* when viewed from the Y-axis direction. In other words, the middle portion 38C is disposed so as to overlap the hollow region V when viewed from the Y-axis direction.

The rib portion 351 extends in the X-axis direction between the support portion 34*b* and the support portion 34*c* when viewed from the Y-axis direction. The rib portion 35D covers at least the middle of the opening S5 when viewed from the Y-axis direction. In other words, the rib portion 35D covers the middle of the hollow region V when viewed from the direction corresponding to the rib portion 35D. The rib portion 35D includes a pair of end portions 36D and 37D and a middle portion 8D connected to the pair of end portions 36D and 37D. The pair of end portions 36D and 37D are connected to the main body portion 31C. The middle portion 38D is separated from the main body portion 31C. In this modification example, the end portion 36D of the rib portion 35D is connected to the support portion 34*b*, and the end portion 371 of the rib portion 35D is connected to the support portion 34*c*.

The middle portion 38D extends in the X-axis direction from one of the end portion 36D and the end portion 371 toward the other. The middle portion 38D has the same shape as the middle portion 38. The edge 38*a* of the middle portion 38D defines the opening S1 together with the edge 32*b* of the vibrating portion 32. The middle portion 38D covers at least the middle of the opening S5 and faces the piezoelectric element 10 when viewed from the X-axis direction. The middle portion 38D is disposed between the pair of support portions 34*b* and 34*c* when viewed from the Y-axis direction. In other words, the middle portion 38D is disposed so as to overlap the hollow region V when viewed from the Y-axis direction.

As a further modification example of this modification example, the rib portions 35, 35C, and 35D of the acoustic device 3C may be respectively replaced with rib portions having the same shape as the rib portions 35A and 35B. In this case, at least one of the rib portions 35, 35C, and 35D may be replaced with a rib portion having the same shape as the rib portions 35A and 35B.

As described above, in the acoustic devices 3, 3A, 3B, and 3C, the rib portions 35, 35A, and 35B cover the middle of the hollow region V defined by the vibrating portion 32 and the plurality of support portions 34*a*, 34*b*, and 34*c* when viewed from the X-axis direction, According to this configuration, in a case where a sound is emitted with the acoustic devices 3, 3A, 3B, and 3C provided on the cover member 2 or the like, the sound pressure level in a desired frequency band is adjusted by the rib portions 35, 35A, and 35B. In other words, the acoustic devices 3, 3A, 3B, and 3C are capable of emitting a sound in which the sound pressure level in a desired frequency band is adjusted in a state of being provided on the cover member 2. In other words, the sound generation device 1 is capable of emitting a sound in which the sound pressure level in a desired frequency band is adjusted.

Figure 12:
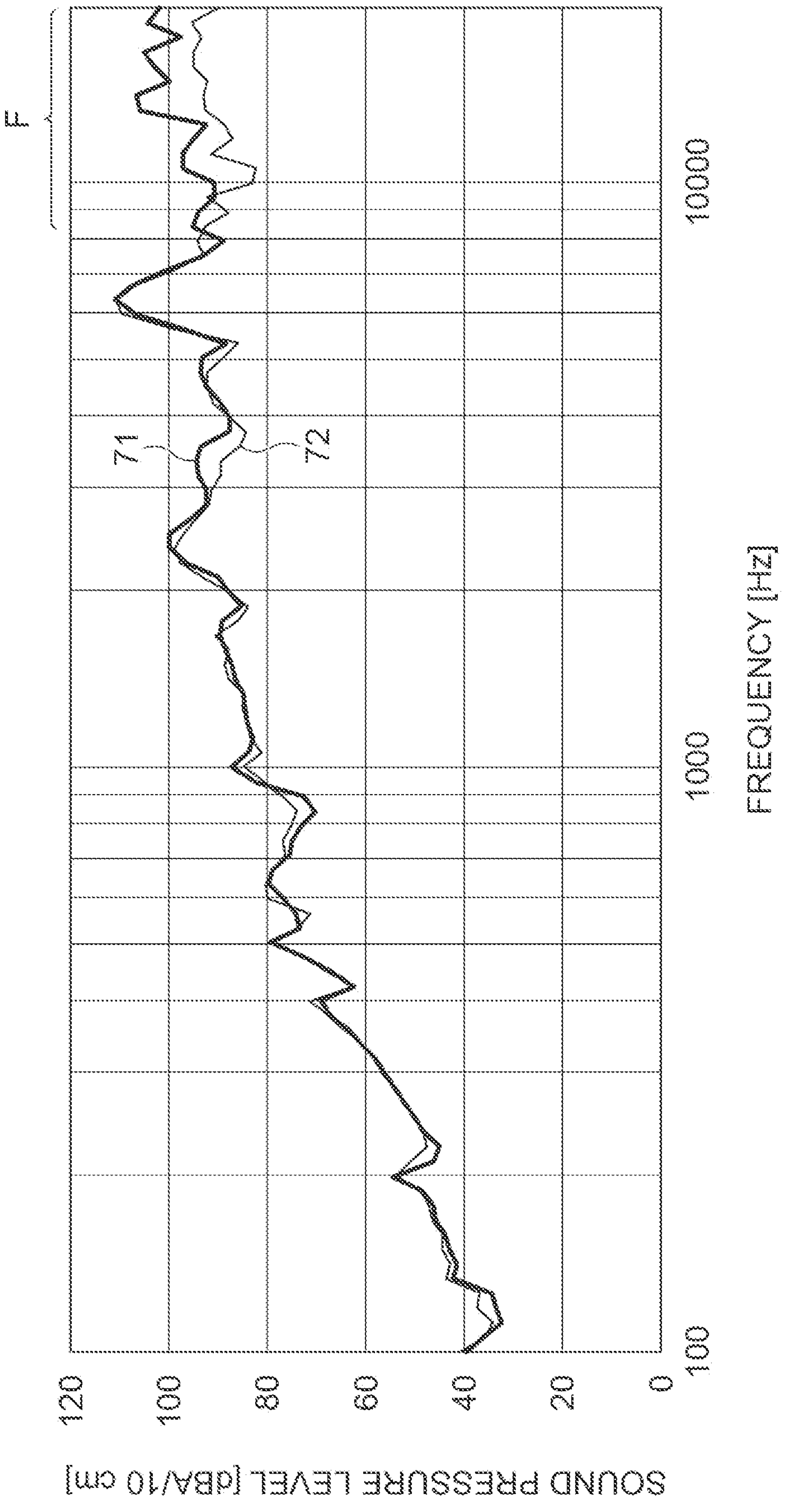
FIG. 12 is a diagram illustrating frequency-specific sound pressure levels in the sound generation device.

FIG. 12 illustrates frequency-specific sound pressure levels in the sound generation device 1 provided with the rib portion 35 and the sound generation device 1 from which the rib portion 35 is removed. Graph 71 illustrates the frequency-specific sound pressure levels of the sound generation device 1 provided with the rib portion 35. Graph 72 illustrates the frequency-specific sound pressure levels of the sound generation device 1 from which the rib portion 35 is removed. As illustrated in FIG. 12, with the rib portion 35 provided, a significant improvement in sound pressure level was observed in the frequency band F in the human audible range and no big change in sound pressure level was observed in the bands other than the frequency band F. In this manner, it was confirmed that the sound generation device 1 emits a sound in which the sound pressure level in a desired frequency band is adjusted.

The opening S1 penetrates the acoustic devices 3, 3A, 3B, and 3C in the Z-axis direction. The opening S1 is defined by the rib portions 35A, 35B, 35C, and 35D and the main body portion 31. According to this configuration, in a case where a sound is emitted with the acoustic devices 3, 3A, 3B, and 3C provided on the cover member 2, the sound pressure level in the entire frequency band can be improved while the sound pressure level in a desired frequency band is adjusted by the rib portion 35.

In the acoustic devices 3, 3A, 3B, and 3C, each of the support portions 34*a* and 34*b* includes the edge 33*b* and the edge 33*d*. When viewed from the X-axis direction, the edge 33*d* of each of the support portions 34*a* and 34*b* is farther from the main surface β than the rib portions 35, 35A, 35B, 35C, and 35D in the Z-axis direction. According to this configuration, the opening S3 is formed. The opening S3 communicates with the hollow region V between the cover member 2 and the rib portions 35, 35A, 35B, 35C and 35D in a state of being provided on the cover member 2. In the sound generation device 1, the opening S3 is defined by the cover member 2, the pair of support portions 34*a* and 34*b*, and the rib portions 35, 35A, 35B, 35C, and 35D when viewed from the X-axis direction. In this case, the sound pressure level in the entire frequency band is further improved while the sound pressure level in a desired frequency band is adjusted by the rib portions 35, 35A, 35B, 35C, and 35D.

In the acoustic devices 3, 3A, 3B, and 3C, the rib portions 35, 35A, and 35B include the pair of end portions 36 and 37 and the middle portion 38. The middle portion 38 includes the curved surface 39. The curved surface 39 is curved so as to face the piezoelectric element 10 and be separated from the piezoelectric element 10 in the X-axis direction. In the acoustic device 3C, the rib portion 35C includes the pair of end portions 36C and 37C and the middle portion 38C. In the acoustic device 3C, the rib portion 35D includes the pair of end portions 36D and 37D and the middle portion 38D. The middle portion 38D includes the curved surface 39. According to this configuration, in a case where a sound is emitted in the state of provision on the cover member 2, the sound pressure level in a desired frequency band can be more appropriately adjusted by the rib portions 35, 35A, 35B, 35C, and 35D.

In the acoustic devices 3 and 3C, the curved surface 39 of the rib portion 35 is continuously connected to the pair of end portions 36 and 37. The curved surface 39 is curved so as to be separated from the piezoelectric element 10 as the distance from the pair of end portions 36 and 37 increases. The curved surface 39 of the rib portion 35C is continuously connected to the pair of end portions 36C and 37C. The curved surface 39 is curved so as to be separated from the piezoelectric element 10 in the X-axis direction as the distance from the pair of end portions 36C and 37C increases. The curved surface 39 of the rib portion 35D is continuously connected to the pair of end portions 36D and 37D. The curved surface 39 is curved so as to be separated from the piezoelectric element 10 as the distance from the pair of end portions 36D and 37D increases. According to this configuration, in a case where a sound is emitted in the state of provision on the cover member 2, the sound pressure level in a desired frequency band can be more appropriately adjusted by the rib portions 35, 35C, and 35D.

In the acoustic device 3A, the middle portion 38 includes the plurality of curved surfaces 39. The middle portion 38 includes the protruding portion 53. The protruding portion 53 protrudes toward the vibrating portion 32 from the position sandwiched between the mutually adjacent curved surfaces 39 when viewed from the Z-axis direction. According to this configuration, in a case where a sound is emitted in the state of provision on the cover member 2, the sound pressure level in a desired frequency band can be more appropriately suppressed by the rib portion 35.

In the acoustic device 3C, the housing 30C includes the plurality of rib portions 35, 35C, and 35D. The plurality of rib portions 35, 35C, and 35D are connected to the main body portion 31C at mutually different positions. According to this configuration, in a case where a sound is emitted with the acoustic device 3C provided on the cover member, the sound pressure level in a desired frequency band can be more appropriately adjusted by each of the rib portions 35, 35C, and 35D. The sound pressure level in the entire frequency band can be further improved.

Although an embodiment and modification examples of the present invention have been described above, the present invention is not necessarily limited to the above embodiment, and various changes can be made without departing from the gist thereof.

As for the rib portions 35, 35A, 358, 35C, and 35D in the above embodiment and modification examples, the surface on the side opposite to the curved surface 39 is also curved along the curved surface 39. However, the surface on the side opposite to the curved surface 39 may not be a surface along the curved surface 39. For example, the surface on the side opposite to the curved surface 39 may be a flat surface. For example, the rib portion 358 includes a convex surface 61*a* on the side opposite to a concave surface 61*b* including the curved surface 39. However, the surface on the side opposite to the concave surface 61*b* may be a flat surface.

The plurality of support portions 34*a*, 34*b*, and 34*c* may be formed in the shape of a single and integrally configured curved plate. In this case, the support portion 33 may be curved so as to surround the piezoelectric element 10 when viewed from the Z-axis direction.

REFERENCE SIGNS LIST

1: sound generation device, 2: cover member, 2*a*: attachment surface, 3, 3A, 3B, 3C: acoustic device, 10: piezoelectric element, 30, 30A, 30B, 30C: housing, 31, 31A, 31C: main body portion, 32: vibrating portion, 32*a*, 32*b*, 32*d*, 33*b*, 33*d*: edge, 33, 34*a*, 34*b*, 34*c*: support portion, 35, 35A, 358, 35C, 35D: rib portion, 36, 36C, 36D, 37, 37C, 37D: end portion, 38, 38C,

38D: middle portion, 39: curved surface, 53: protruding portion, S1, S3: opening, β: main surface, V: hollow region.

The invention claimed is:

1. An acoustic device comprising:

a piezoelectric element; and a housing where the piezoelectric element is disposed, wherein the housing includes a main body portion including a vibrating portion including a vibrating surface where the piezoelectric element is disposed, and a plurality of support portions extending from the vibrating portion in a first direction intersecting the vibrating surface and disposed along an edge of the vibrating portion, and a rib portion connected to the main body portion and extending in a third direction between a pair of the support portions when viewed from a second direction along the vibrating surface, the pair of the support portions facing each other and separated from each other in the third direction intersecting the second direction, a hollow region defined by the vibrating portion and the plurality of support portions and an opening defined by the rib portion and the main body portion and communicating with the hollow region are formed in the housing, and the rib portion covers a middle of the hollow region when viewed from the second direction.

2. The acoustic device according to claim 1, wherein the opening defined by the rib portion and the main body portion penetrates the acoustic device in the first direction.

3. The acoustic device according to claim 1, wherein each of the support portions includes a first edge extending along the vibrating portion and connected to the vibrating portion, and a second edge positioned on a side opposite to the first edge in the first direction, and the second edge of each of the support portions is farther from the vibrating surface than the rib portion in the first direction when viewed from the second direction.

4. The acoustic device according to claim 1, wherein the rib portion includes a pair of end portions connected to the main body portion and a middle portion connected to the pair of end portions and separated from the main body portion, and the middle portion includes a curved surface facing the piezoelectric element and curved so as to be separated from the piezoelectric element in the second direction.

5. The acoustic device according to claim 4, wherein the curved surface is continuously connected to the pair of end portions and is curved so as to be separated from the piezoelectric element as a distance from the pair of end portions increases.

6. The acoustic device according to claim 4, wherein the middle portion includes a plurality of the curved surfaces and a protruding portion protruding toward the vibrating portion from a position sandwiched between the curved surfaces adjacent to each other when viewed from the first direction.

7. The acoustic device according to claim 1, wherein the housing includes a plurality of the rib portions connected to the main body portion at mutually different positions, and the plurality of rib portions cover the middle of the hollow region when viewed from the second direction corresponding to each of the rib portions.

8. A sound generation device comprising:

the acoustic device according to claim 1; and a cover member including an attachment surface which faces the vibrating surface and to which the plurality of support portions are connected.

9. The sound generation device according to claim 8, wherein an opening defined by the cover member, the pair of support portions, and the rib portion when viewed from the second direction is formed.

10. An acoustic device comprising:

a piezoelectric element; and a housing where the piezoelectric element is disposed, wherein the housing includes a main body portion including a vibrating portion including a vibrating surface where the piezoelectric element is disposed, and a support portion extending from the vibrating portion in a first direction intersecting the vibrating surface, and a rib portion connected to the main body portion and extending in a third direction intersecting a second direction when viewed from the second direction along the vibrating surface, a hollow region defined by the vibrating portion and the support portion and an opening defined by the rib portion and the main body portion and communicating with the hollow region are formed in the housing, and the rib portion covers a middle of the hollow region when viewed from the second direction.

* * * * *